March 19, 1929.  E. L. WIEGAND  1,706,015
ELECTRIC HEATING DEVICE
Filed Oct. 15, 1924  2 Sheets-Sheet 1
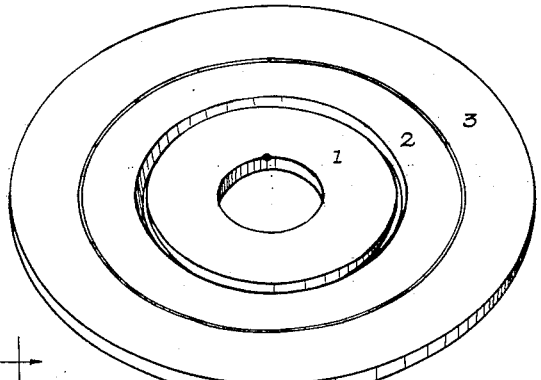
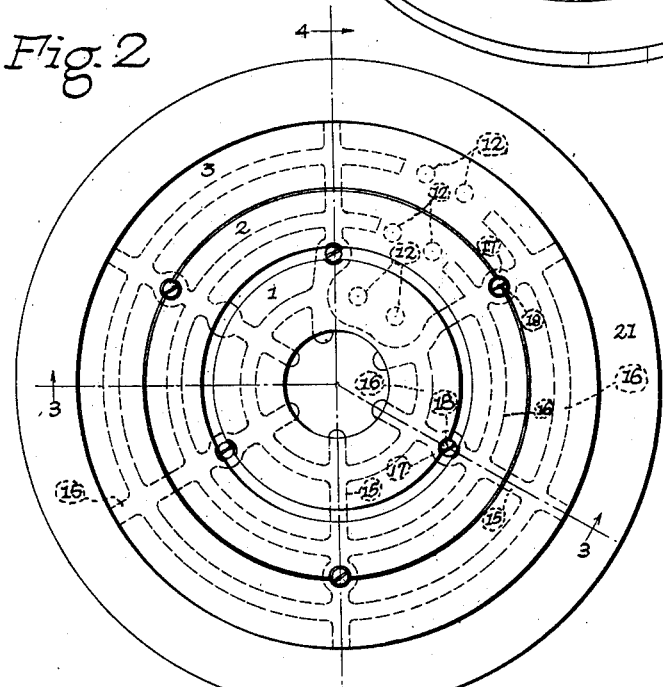
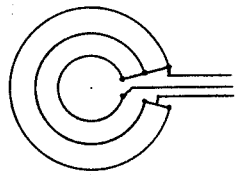
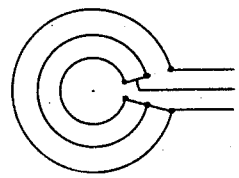
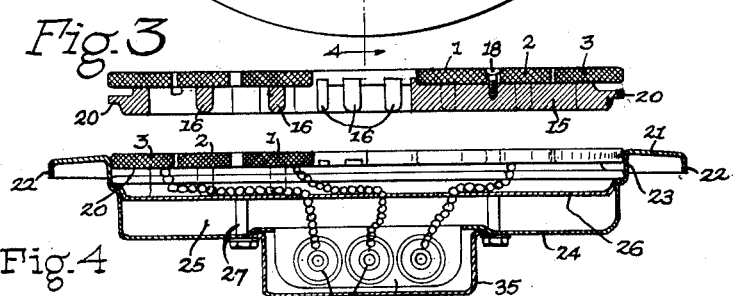
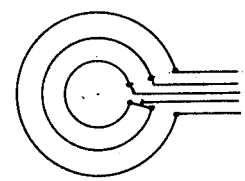
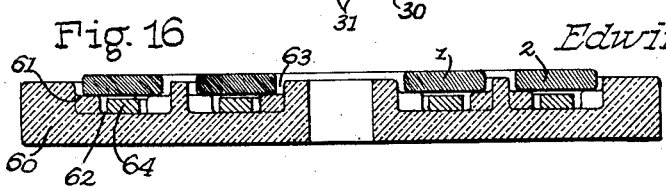
Edwin L. Wiegand
Inventor
Smith & Freeman
Attorneys March 19, 1929.  E. L. WIEGAND  1,706,015
ELECTRIC HEATING DEVICE
Filed Oct. 15, 1924   2 Sheets-Sheet 2
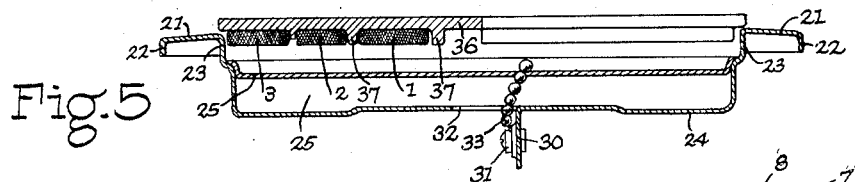
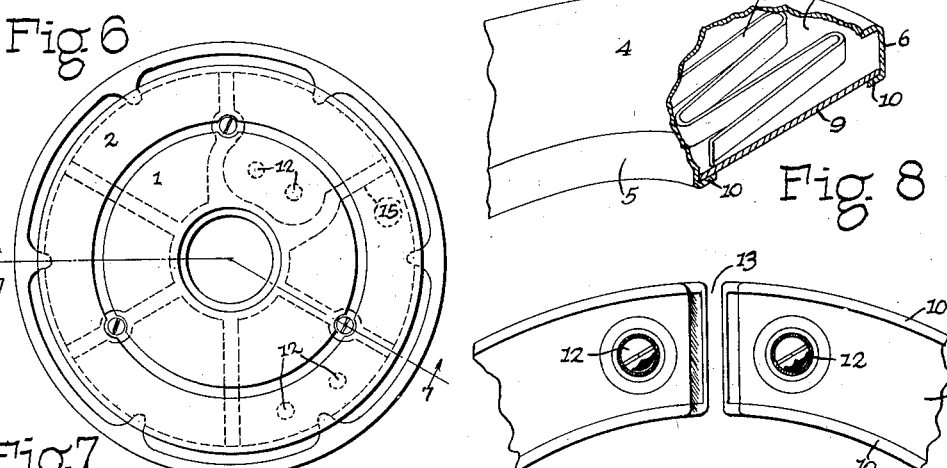
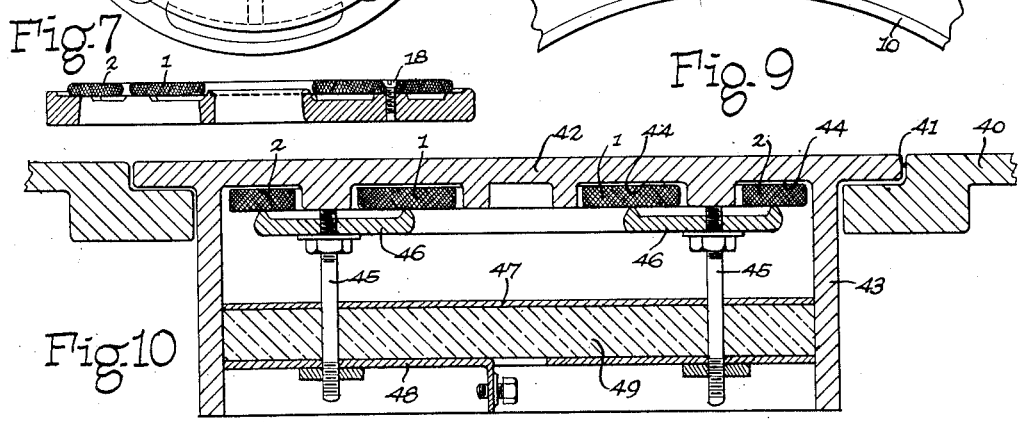
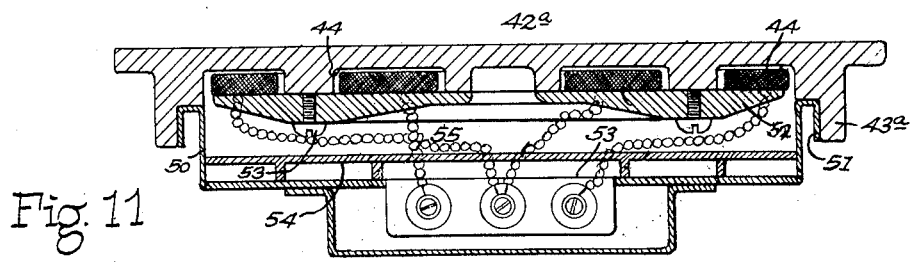
Edwin L. Wiegand
Inventor
Smith & Freeman
Attorneys Patented Mar. 19, 1929.

1,706,015

UNITED STATES PATENT OFFICE

EDWIN L. WIEGAND, OF DORMONT, PENNSYLVANIA, ASSIGNOR TO EDWIN L. WIEGAND COMPANY, OF PITTSBURGH, PENNSYLVANIA, A CORPORATION OF PENNSYLVANIA.

ELECTRIC HEATING DEVICE.

Application filed October 15, 1924. Serial No. 743,663.

This invention relates to electric heating devices and has especial reference to a cooking plate although many of its features are likewise applicable to heaters for technical and commercial purposes. The objects of the invention are the provision of a new form of surface heater which shall exhibit peculiar and valuable characteristics as regards weight, freedom from cracking, warping, short-circuiting, heating rate, thermal efficiency, and longevity; the provision of a metal sheathed heating device wherein the different portions may be heated at different times or to unequal temperatures; the provision of new and improved expedients for safe-guarding such a heating element from grease or other foreign substances and also insulating the same against heat loss; the provision of new and improved arrangements for supporting such heating elements, and also impeding their burning out; while further objects and advantages of the invention will become apparent as the description proceeds.

This application is in part a continuation of my former application for electrical heating elements, filed August 31, 1923, Serial No. 660,294, and of my copending application Serial No. 697,446, filed March 7, 1924, the strips being curved laterally to ring form.

In the drawings accompanying and forming a part of this application I have shown various physical forms in which my inventive idea can be embodied since it is not my purpose to restrict myself to any one form or arrangement of parts inasmuch as my invention is capable of embodiment in many different specific devices.

Fig. 1 is a perspective view of an assemblage of elements comprising my invention; Fig. 2 is a top plan view of a completed stove lid member showing one mode of use of the elements illustrated in Fig. 1; Fig. 3 is a sectional view corresponding to the broken line 3—3 of Fig. 2 illustrating the construction and assemblage of the heating elements and their support; Fig. 4 is a central sectional view corresponding to the line 4—4 of Fig. 2, the heating elements being shown half in elevation; Fig. 5 is a sectional view of the casing shown in Fig. 4 at right angles to the former section and showing a modified form of heating element; Fig. 6 is a top plan view of a modified form of heating device; Fig. 7 is a sectional view corresponding to the broken line 7—7 of Fig. 6; Fig. 8 is a broken perspective view of a portion of one of the elements illustrated in any of the previous views; Fig. 9 is a plan view showing a modified form of element wherein the ring is discontinuous; Figs. 10 and 11 are sectional views through different types of range-heating elements applicable for commercial use such as in hotels; Figs. 12, 13, and 14 are diagrams of different wiring plans; and Figs. 15 and 16 illustrate modified forms of supporting members.

An important feature of my invention is the formation of a heating element in annular form, the electrical resistance member being housed within a metallic sheathing, one side of which, the working side, is preferably flat although susceptible of curvature to fit any special requirement such as that of a round bottom vessel. A second important feature of my invention is the collection of two or more of these annular elements of unequal size, one inside the other with their working faces tangent to the same geometrical surface, either flat or curved as the case may be, so that much or little surface can be heated as desired, and an easy heat control effected; while further and more specific features relate to the mechanical means for supporting, enclosing, shielding, insulating, and utilizing these elements.

In Figs. 1 to 4 of the drawings I have shown three of my improved elements represented at 1, 2, and 3. Each of these elements consists of an annular sheeting of thin sheet metal having a substantially flat working surface 4 (see Fig. 8) merging at its inner and outer edges with flanges 5 and 6 respectively defining an interior space 7 in which is located a suitable resistor element 8, the bottom side of the chamber opposite the surface 4 being closed by a suitable plate 9, here shown as secured in position by having the lips 10—10 of the flanges 5 and 6 spun tightly thereover. These may also be welded if desired to increase the tightness and the metal may be of any substance desired, Monel metal being one of the favorite substances owing to its high resistivity to oxidation at high temperatures although any other metal can be employed within the scope of my invention. The resistor element preferably takes the form of a ribbon wire formed in gigzag shape mounted inside the chamber with the plane of the ribbon at right angles to the working surface, and surrounded and supported at all points by some suitable refractory electrically insulating but heat conducting substance tightly compacted therein. I have used alloys of chromium with iron group metals with much success for the resistor material and a good insulating material for the purpose can be made either from granular alumina or the silicates of zirconium or magnesium, but I do not restrict myself thereto. The ends of the wire are connected to suitable binding posts 12—12. It is within my invention to sever the sheating between the two binding posts as shown at 13 in Fig. 9 which is the bottom elevation of a modified form, but in the preferred species the top surface forms an unbroken ring as shown in Fig. 1. Preferably these resistance elements are so designed as to produce a very large heating effect per square inch and the formation of the entire heating device in the form of independent annular sections permits a much greater heating effect than heretofore possible owing to the mechanical independence of the sections which permits individual expansion.

In the case of elements designed for operation at high concentrations of energy per square inch it is important not to mount them in such a way that the escape of heat from their bottom surfaces is too immediately obstructed, but the insulating material is best located at some little distance therefrom; and it is desirable that they be supported in such a way as to permit relative expansion and contraction, and be not pierced with holes for screws or other fastenings, and be so mounted on the side opposite the working surface as to conserve the greatest possible quantity of heat without at the same time inviting local fusion. The preferred mode of effecting this is by means of a metallic spider shown in Figs. 2, 3, 6, and 7, the same having a plurality of radial arms 16 connected by spaced circumferential ribs 16—16. These ribs are formed at proper points with bosses 17 for the reception of flat-head screws 18 which pass through the slots between adjacent elements and overlie the same sufficiently to hold them in place. In the preferred form the ribs 16 depend midway of the width of each element, the upper surface of the rib approaching very closely to the lower face of the member, since this tends to withdraw heat from the member at the point where it is most liable to fusion. The ribs 16 are more or less completely omitted between one pair of arms as shown in the upper right hand segment of Fig. 2 to afford space for the binding posts 12—12. I have shown the different sets of binding posts as registering angularly with each other although this is not necessary.

The outer ends of the ribs are preferably merged with an unbroken circumferential flange 20 of a size to fit a small stove-plate hole, and under some conditions can be employed directly without further attachments excepting suitable terminals. Preferably, however, I mount this device in a suitable housing shown in Figs. 2 and 4 which may comprise a circular sheet metal plate having a substantially flat annular portion 21 formed at its outer margin with a down turned flange 22 adapted to fit a larger stove hole and at its inner margin with a circular recess 23 adapted for the reception of the device already described, the mid portion of the plate being here shown as drawn to produce a flat bottom 24 for the chamber 25, the bottom 24 being unbroken excepting for bolting and wiring provisions. Preferably I locate beneath the electric element a polished sheet metal plate 26 which shell reflect upwardly a considerable proportion of the heat which falls thereon, fastening this plate in place as by suitable bolts 27 and filling the chamber beneath the same with mineral wool or other insulator. In order to provide for the attachment of wires I have shown the bottom 24 as provided with an ear 30 which is punched out and bent downwardly as shown in Fig. 5 for the reception of binding posts 31, this also providing an opening 32 for the passage of the wires from the binding posts 12, and facilitates assembling. These wires are preferably insulated by refractory beads 33. The terminals 31 can afterwards be covered by a separate housing 35 if desired.

In some cases where it is desired to produce a more uniformly distributed and less intense heat or for the purpose of mechanical and sanitary protection I provide the electrical resistance elements with a cover 36 which may be made of cast iron or other suitable material, preferably with ribs 37 to fit the spaces between adjacent elements.

Other modes of supporting and using my improved annular elements are illustrated in Figs. 10 and 11, wherein 40 denotes a flat horizontal plate such as the top of a hotel range, provided with a hole 41, and 42 represents a circular plate of cast iron or other suitable metal adapted to fit the hole and lie flush with the plate, its bottom side being provided with a depending integral flange 43 of considerable depth. The bottom face of the plate 42 is formed with annular recesses 44, 44, one inside the other, adapted for the reception of the elements 1 and 2 (or a greater number if desired). One of the simplest ways of securing these elements in place is to place bolts 45 into the ribs between adjacent recesses and by their aid support suitable fastenings 46, such as the metal rings shown. The same bolts can also be employed to support a reflecting plate 47, a bottom plate 48, and an intervening insulating layer 49, as shown in Fig. 10 all of which are preferably located above the lip of the flange 43 so that grease or other liquids which chance to be spilled on the device will be carried past the parts which it might otherwise injure. In Fig. 11 I have shown a similar plate 42$^a$ provided with a similar flange 43$^a$, excepting that the flange is of much smaller depth, being extended by means of a hollow sheet metal casing 50 which is sprung therein. I have shown the edge of this casing 50 as turned over to form a grease proof joint 51 and in this case I have shown the elements as held in place by a metal clamping ring 52 and screws 53. This ring serves the double purpose of holding the tops of the elements in contact with the plate 42$^a$ and of conveying heat from their lower surfaces to the plate 42$^a$. Insulating material is then packed into the space 55 beneath these members and held in place by a false bottom plate 54.

It is not necessary to use a metallic support as the customary porcelain base can be modified to receive these metal sheathed elements. The simplest form is shown in Fig. 15 wherein the upper surface of the refractory 60 is formed with flat grooves 61, for the reception of the elements, 1, and 2. The limit of feasibility for this construction depends upon the energy concentration, and the thermal conductivity of the support. Such substances as porcelain having a fairly high heat conductivity will permit a considerable energy concentration without destruction of the sheathing, while such substances as silocel and other materials of pronounced heat insulating characteristics are best formed with a second groove 62 at the bottom of the main groove as shown in Fig. 16 and preferably also with vents or convection channels 63 leading therefrom. Increased heat dissipation can be secured by locating a metal ring 64 in the groove 62 in case of need, or the groove can be left empty.

It will be understood that many changes and rearrangements can be made between the various ideas, designs, and features herein set forth and that I do not restrict myself in any wise except as set forth in my several claims which I desire may be read each independent of limitations contained in other claims.

Having thus described my invention what I claim is:

1. An electric heating device comprising a structurally independent hollow annulus having a flat metal contact face, a resistance member in operative relation to said face, and a detachable support for said annulus.

2. An electric heating device comprising a plate of heat resistant sheet metal having annular flanges extending laterally from its respective margins, an annular closure plate tightly secured to the margins of both of said flanges and defining with said first plate a hollow annular chamber, an electric resistance heating element located inside said chamber, and means supporting said plate with its unbroken face uppermost.

3. An electric heating device comprising a plurality of independent, annular, metal-sheathed resistance elements supported one inside the other and having contact faces both lying substantially in the same working surface.

4. In an electric heating device, in combination, a plurality of annular, metal clad resistance heating elements located one inside the other with their working faces both lying substantially in the same working surface, and means upon their opposite sides for abstracting heat from the hottest portion and conveying such heat to said working surface.

5. An electric heating device comprising a plurality of annular bodies, located one within the other, having plane metallic working faces arranged substantially in the same plane and an electric resistor device within each body adapted to heat the same independently of the other bodies.

6. An electric heating device comprising a plurality of independent annular, metal-faced, heating elements, one inside the other, mechanical supporting means for said elements, and electric terminal provisions on said elements.

7. An electric heating device comprising a plurality of independent annular, metal-sheathed, heating elements located one inside the other, a support therefor, and means engaging said support and extending between the adjacent elements whereby said elements are secured to said support.

8. An electric heating device comprising, in combination, a metallic supporting member and a plurality of independent, annular, metal-sheathed, heating elements secured to said supporting member one inside the other.

9. An electric heating device comprising, in combination, a supporting member, a plurality of independent, annular, metal-sheathed, refractory-insulated, electric resistance elements secured thereto and having outwardly facing working faces and means for directing the heat radiated from the opposite surfaces of said elements to the working surface defined by said working faces.

10. An electric heating device comprising a plurality of independent, annular, metal-sheathed, resistance elements, and a metal covering member engaging the outer faces of said elements in heat-conducting relation.

11. An electric heating device comprising a plurality of independent, annular, metal-sheathed, resistance elements, and heat insulating and reflecting material underlying said elements and spaced therefrom.

12. An electric heating device comprising a plurality of independent annular, metal-sheathed, refractory heating elements of different sizes located one inside the other, their upper faces both lying substantially in the same working surface, and heat insulating material underlying said elements at a short distance.

13. An electric heating device comprising a plurality of annular, metal-sheathed, refractory, heating elements of different sizes located one inside the other, their upper faces being substantially in the same geometric surface, heat insulating material underlying said elements at a short distance, and a metallic member interposed between said elements and said heat insulating material, said member associated with the bottom faces of said elements in heat-abstracting relation.

14. An electric heating device of the character described comprising, in combination, a circular metal member adapted to fit a hole in a stove top, and a plurality of independent annular, flat-topped, metal-sheathed, resistor elements carried by said member, one within the other.

15. An electric heating device of the character described comprising, in combination, a circular metal member adapted to fit a hole in a stove top, said member having a central circular recess, heat insulating material in said recess, and a plurality of annular, flat-topped, metal-sheathed, resistor elements spaced above said material and bridging said recess, said elements arranged one inside the other with their top faces substantially in the same plane.

16. An electric heating device of the character described comprising, in combination, a circular metal member adapted to fit a hole in a stove top, said member having a central circular recess, heat insulating material in said recess, a metal, heat-reflecting plate overlying said material, and a plurality of annular, flat-topped, metal-sheathed, electrical resistance units spaced above said plate and bridging said recess, said units being arranged one inside the other and having their upper surfaces in substantially the same plane.

17. In an electric heating device, in combination, a circular metal plate, a plurality of annular metal-sheathed refractory-insulated, electric heating elements of comparatively thin substantially rectangular cross section supported one inside the other in heat conducting relation with the metal plate, and heat insulating and reflecting means beneath said plate at a distance from said elements.

18. An electric heating device comprising a plurality of independent, annular, metal-sheathed, refractory-insulated resistance heating elements of substantially rectangular cross section located one inside the other, their working faces both lying substantially in the same geometric surface.

19. An electric stove comprising a top plate, and a heating element supported in the top plate consisting of a metal sheath and a resistor embedded in an electrical insulating and heat conducting material filling said sheath, the sheath being comparatively thin and shaped to provide a flat vessel-supporting top above said plate and being adapted to be heated throughout to a red heat.

20. The combination of a support having a circular opening therein, and a ring heating element carried by said support within said opening consisting of a metal ring shaped sheath and a resistor embedded in an electrical insulating and heat conducting material filling said sheath, the sheath having a flat vessel-supporting top above said support.

21. An electric stove comprising, in combination, a support, and a plurality of ring heating units nested one within another in concentric relation on said support, said units providing a flat vessel-supporting top and being individually removable from the support.

22. An electric stove comprising, in combination, a top plate, a ring heating element in said top plate consisting of a metal sheath having flat upper and lower walls joined by inner and outer circular walls, a resistor embedded within the sheath in an electrical insulating and heat conducting material in contact with the walls thereof, the upper wall of the sheath providing a broad, flat, vessel-supporting surface for heating by conduction, and supporting means for said ring element providing limited air space beneath and substantially throughout the underside of said element.

23. An electric heating device comprising a pair of electric heating elements, both of annular form, having flat working faces, and independent of each other, the annuli being of unequal size and located one inside the other.

24. An electric heating device comprising a plurality of annular, metal-sheathed, refractory-insulated, heating elements having flat faces, the elements being of unequal size, independent of each other, and arranged one inside the other.

25. In electric heating apparatus, a pair of electric heating elements of unequal size and independent of each other, both having flat, metallic working faces, the larger element being of annular shape and the smaller having a circular periphery and adapted to fit inside the larger element.

26. An electric stove comprising a top plate, and outer and inner heating elements each consisting of a metal sheath and a resistor, embedded in an electrical insulating and heat conducting material filling said sheath, the sheath of each element being shaped to provide a flat vessel-supporting top, the outer element being in the form of a ring and the inner element being positioned within said ring, and means supporting said heating elements in the top plate with the flat tops of the elements coplanar and above the top plate.

27. An electric stove comprising a disk support having annular concentric seats and an intermediate air space, and a flat ring heating element supported on said seats.

28. An electric stove comprising a support having concentrically arranged seats, a plurality of flat ring heating elements supported on said seats one within another, and means engaging contiguous edges of the ring elements for holding them on the support.

29. In an electric stove, in combination, a top plate having an opening therethrough, a plurality of ring heating elements nested one within another in concentric relation in said opening, and a circular disk support removably mounted on the top plate within said opening and constructed to support said ring elements in said relation and so that they provide a flat vessel-supporting top above the top plate.

30. In an electric stove, in combination, a plurality of ring heating elements, and a support for holding said elements, nested one within another in concentric relation, and providing marginal seats on which the ring elements rest and intermediate air space below said elements.

31. An electric stove comprising a disk support, and a plurality of individually removable ring heating elements nested one within another in concentric relation on said support, each consisting of a metal sheath having a flat vessel-supporting top and a resistor insulated therein.

32. An electric stove comprising, in combination, a top plate, a plurality of ring heating elements nested one within another in concentric relation and providing a flat vessel-supporting top for heating by conduction, means supporting said ring elements in said relation in the top plate, and a heat-resisting body spaced beneath and in close proximity to said ring elements with an air space intervening.

33. In an electric stove, in combination, a plurality of ring heating elements providing a vessel-supporting top on which a vessel will be heated by conduction, a support providing concentric seats on which marginal portions of the ring elements are supported and intermediate air spaces beneath the ring elements, a top plate having an opening therethrough, and means holding said support in said opening with said vessel-supporting top slightly above the top face of the top plate and allowing an air space between the ring support and top plate.

34. An electric stove comprising, in combination, a top plate, and a ring heating element supported in said top plate consisting of a metal sheath having flat upper and lower walls joined by inner and outer circular walls, and a resistor embedded within the sheath in an electrical insulating and heat conducting material in contact with the walls thereof, the upper wall of the sheath providing a broad, flat vessel-supporting surface for heating by conduction.

35. An electric stove comprising, in combination, a top plate, a ring heating element in said top plate consisting of a metal sheath having flat upper and lower walls joined by inner and outer circular walls, a resistor embedded within the sheath in an electrical insulating and heat conducting material in contact with the walls thereof, the upper wall of the sheath providing a broad, flat, vessel-supporting surface for heating by conduction, and supporting means for said ring element providing limited air space beneath and substantially throughout the under side of said element.

36. An electric stove comprising, in combination, a top plate, a ring-heating element in said top plate consisting of a metal sheath having flat upper and lower walls joined by inner and outer circular walls, a resistor embedded within the sheath in an electrical insulating and heat conducting material in contact with the walls thereof, the upper wall of the sheath providing a broad, flat, vessel-supporting surface for heating by conduction, supporting means for said ring element providing limited air space beneath and substantially throughout the under side of said element, and a base of heat resisting material below said element supporting means.

37. An electric stove comprising, in combination, a top plate, a ring heating element in said top plate consisting of a metal sheath having flat upper and lower walls joined by inner and outer circular walls, a resistor embedded in an electrical insulating and heat conducting material within the sheath, and means supporting said ring element with substantially the entire under side exposed for direct radiation, said supporting means being constructed to intercept said radiation and being in heating conducting contact with the sheath.

38. An electric cooking top comprising, in combination, a plurality of ring heating elements nested one within another in concentric relation providing a flat, vessel-supporting top, and a support providing concentric seats for said ring elements from which they are individually removable.

39. An electric stove comprising, in combination, a ring heating element having a flat, shallow metal sheath and a resistor embedded in an electrical insulating and heat conducting material filling said sheath, and means supporting said ring element with its top surface exposed for supporting a vessel and with its under surface exposed.

40. An electric stove comprising, in combination, a plurality of ring heating elements, a support holding said elements in concentric relation and providing a cooking top, and a block of heat resisting material below and in proximity to said support.

41. An electric stove comprising, in combination, a top plate, an electric heating element in flat ring form consisting of a metal sheath having a flat top and a bottom wall joined by circular outer and inner side walls, the top wall providing a cooking top, a resistor embedded in an electrical insulating and heat relation providing a cooking top on which vessels may be directly supported and heated by conduction, a support on which the ring elements are seated, a casing carrying said ring support, a block of heat resisting material below the ring support, and means connecting the ring elements, support, casing and block in a unit assembly which may be set into and removed from the top plate.

In testimony whereof, I hereunto affix my signature.

EDWIN L. WIEGAND.